(12) United States Patent
Rao et al.

(10) Patent No.: US 8,610,081 B2
(45) Date of Patent: Dec. 17, 2013

(54) SYSTEMS AND METHODS FOR GENERATING CONTROL SIGNALS IN RADIATION DETECTOR SYSTEMS

(75) Inventors: Naresh Kesavan Rao, Clifton Park, NY (US); Walter Dixon, III, Clifton Park, NY (US); Yanfeng Du, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 48 days.

(21) Appl. No.: 13/304,255

(22) Filed: Nov. 23, 2011

(65) Prior Publication Data

US 2013/0126748 A1    May 23, 2013

(51) Int. Cl.
*G01J 1/42* (2006.01)

(52) U.S. Cl.
USPC .......................................................... 250/394

(58) Field of Classification Search
USPC ................ 250/394, 370.01–370.15; 378/98.8
See application file for complete search history.

(56) References Cited

U.S. PATENT DOCUMENTS

| | | | |
|---|---|---|---|
| 6,169,287 B1 * | 1/2001 | Warburton ................. | 250/370.1 |
| 7,525,098 B2 * | 4/2009 | El-Hanany et al. ........ | 250/370.1 |
| 2006/0165214 A1 | 7/2006 | Mattson et al. | |
| 2008/0024207 A1 | 1/2008 | Baker | |
| 2008/0157986 A1 | 7/2008 | Proctor et al. | |
| 2010/0039923 A1 | 2/2010 | Kim et al. | |
| 2010/0096555 A1 | 4/2010 | Nelson | |
| 2010/0116998 A1 | 5/2010 | Kim | |
| 2010/0140484 A1 | 6/2010 | Snoeren et al. | |
| 2010/0172466 A1 | 7/2010 | Herrmann et al. | |
| 2011/0066026 A1 | 3/2011 | Roeck et al. | |

FOREIGN PATENT DOCUMENTS

EP    1326094 A2    7/2003

OTHER PUBLICATIONS

Zhang et al., "New readout electronics for 3-D position sensitive CdZnTe/Hgl2 detector arrays," 2006, IEEE Transactions on Nuclear Science, vol. 53, No. 5, pp. 3021-3027.*
Zhang et al., "A Novel Data-Sparsification Method for Radiation Detector Readout ASICs", ASIC, 2007. ASICON '07. 7th International Conference, ISBN: 978-1-4244-1132-0 On pp. 494-497, References Cited: 10, Issue Date : Oct. 22-25, 2007.

* cited by examiner

*Primary Examiner* — Kiho Kim
(74) *Attorney, Agent, or Firm* — The Small Patent Law Group; Evan Reno Sotiriou; Jenifer Haeckl (57) ABSTRACT

Systems and methods for generating control signal in radiation detector systems are provided. One system includes a scheduling architecture having at least one anode channel connected to a detector of the radiation detector system. The anode channel includes a charge sensitive amplifier and a signal shaper, wherein the anode channel is configured to generate at least one control signal to control data acquisition by the detector. The scheduling architecture also includes at least one shaper timer configured having a time constant to define timing for the generation of the control signal without using a clock.

21 Claims, 9 Drawing Sheets

SYSTEMS AND METHODS FOR GENERATING CONTROL SIGNALS IN RADIATION DETECTOR SYSTEMS

BACKGROUND

Radiation detectors may be used in a wide variety of applications. For example, radiation detectors may be used in radiation detector systems to capture images of objects. For example, diagnostic images of a person or an animal may be obtained to assist a doctor or other health care professional in making an accurate diagnosis, as well as for imaging luggage and shipping containers or for industrial inspection. Radiation detectors also may be used for non-imaging applications, such as for security detection and identification of radionuclides. In these non-imaging applications, the spectral response for the radiation detectors is used.

The radiation detectors may be, for example, pixelated radiation detectors, such as Cadmium Zinc Telluride (CZT) detectors, which are increasingly used. In these systems, the signal levels (e.g., the amount of signal generated by an x-ray event) from the detector are often extremely small and easily corrupted by digital activity within the system. For example, the digital communication links within the system can generate noise that interferes with the signals from the detectors. However, signals are needed for controlling the system, such as the state of the system, transitions between different operations, etc., for example, during data acquisition.

Additionally, the detected signals in these pixelated radiation detectors can induce transient crosstalk signals into neighboring pixels that affect the subsequent analysis of the radiation spectrum. For example, the transient crosstalk signals may cause a false hit (e.g., false photon hit) to be recorded. Moreover, because true and false hits cannot be distinguished after detection, these false hits are not accounted for in the subsequent signal processing. These incorrect counts (e.g., an incorrect number of photon counts) that are added to the relevant energies may cause significant image artifacts, thereby decreasing image quality and reducing the reliability of image acquisition results and any analysis of these images thereafter. Moreover, when detecting a spectral response, spectrum distortion caused by weighting potential crosstalk can also reduce the detector sensitivity and cause false alarms.

BRIEF DESCRIPTION

In one embodiment, a scheduling architecture for a radiation detector system is provided that includes at least one anode channel connected to a detector of a radiation detector system. The anode channel includes a charge sensitive amplifier and a signal shaper, wherein the anode channel is configured to generate at least one control signal to control data acquisition by the detector. The scheduling architecture also includes at least one shaper timer configured having a time constant to define timing for the generation of the control signal without using a clock.

In another embodiment, a radiation detector system is provided that includes at least one pixelated detector formed from a direct conversion material and a controller configured to control operation of the detector, wherein the controller generates timing signals during a signal acquisition period of the pixelated detector without using a clock. The radiation detector system also includes a processor configured to process signals acquired by the pixelated detector, wherein processing includes digital activity performed during non-acquisition periods of the pixelated detector.

In yet another embodiment, a method for scheduling operations in a radiation detector system is provided. The method includes generating control signals for scheduling operations of a radiation detector system without using a clock during detection times of a detector of the radiation detector system and initiating processing operations during non-detection times of the detector of the radiation detector system. The method also includes processing received data during the non-detection times.

DETAILED DESCRIPTION

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Also as used herein, the term "reconstructing" or "rendering" an image or data set is not intended to exclude embodiments in which data representing an image is generated, but a viewable image is not. Therefore, as used herein the term "image" broadly refers to both viewable images and data representing a viewable image. However, many embodiments generate, or are configured to generate, at least one viewable image. In the various embodiments, the "object" being imaged may be a human individual, another living creature besides a human individual, or inanimate objects, such as, but not limited to, luggage, shipping containers, and/or the like. However, in other embodiments, no image is generated or formatted and only a spectral response is determined.

Various embodiments provide systems and methods that control the communication of data within radiation detector systems by generating control signals without a clock and scheduling the times at which control signals are communicated, as well as when other processing operations are performed. For example, the various embodiments provide scheduling to initiate digital communication to one or more processors during certain time periods (e.g., non-critical times, such as after data acquisition) and generating control signals without a clock during other time periods (e.g., critical times, such as during data acquisition). Additionally, various embodiments provide systems and methods for determining and ignoring crosstalk signals. It should be noted that when reference is made herein to performing an embodiment without a clock, this can include a component that does not include a clock or wherein the system or component has a clock, but the clock is not used.

At least one technical effect of various embodiments is a reduced or minimized likelihood of generating interference, thereby reducing or minimizing the likelihood of affecting data acquisition or subsequent data analysis. At least one other technical effect of various embodiments is increased detector sensitivity and reduction of false alarms.

The various embodiments may be implemented within radiation detector systems, which in various embodiments are radiation detector systems having direct detection or direction conversion detectors. For example, the radiation detector systems in some embodiments include pixelated radiation detectors for detecting x-rays or gamma rays, such as Cadmium Zinc Telluride (CZT) detectors. The various embodiments may be implemented, for example, in connection with Computed Tomography (CT) systems, Single-Photon Emission Computed Tomography (SPECT) systems and Positron Emission Tomography (PET) systems, among other nuclear medicine and x-ray radiation detector systems, which may be single modality or multi-modality systems. Thus, the various embodiments may be implemented in connection with radiation detectors in different types of imaging systems. Applications of radiation detector systems include in addition to medical applications, security applications, industrial inspection applications, and/or the like. Thus, although embodiments are described and illustrated herein with respect to a particular radiation detector system having detectors that detect a specific type of radiation, the various embodiments may be used in other application and may be used to detect other types of electromagnetic energy.

Figure 1:
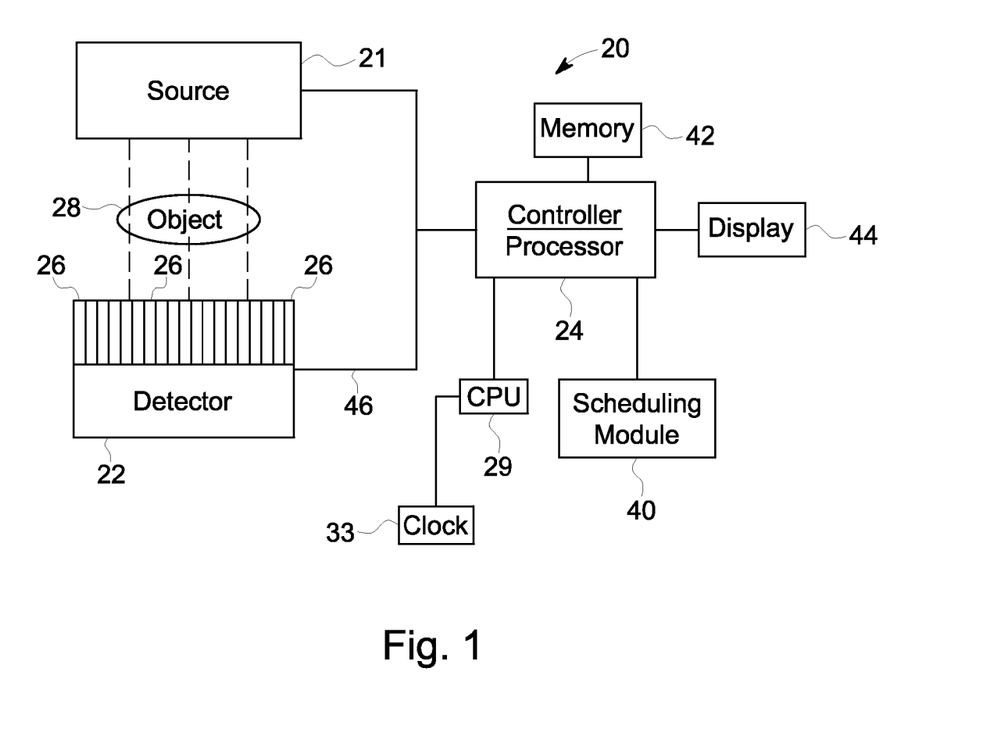
FIG. 1 is a simplified block diagram of a radiation detector system in accordance with various embodiments.

Referring now to FIG. 1, a radiation detector system 20 generally includes a source 21 of electromagnetic energy, one or more detectors 22, and a processor 24. The detector 22 may include a plurality of detector modules 26 that include detectors (or sensors) formed from a direct conversion material (e.g., Cadmium Telluride (CdTe) or CZT). It should be noted that as used herein, a direct conversion detector material generally refers to any detector material that directly converts (in a single conversion step) photons or other high frequency gamma ray energy to electrical signals instead of in a multi-step process such as when using a scintillator (e.g., NaI:Tl (thallium-doped sodium iodide)) and a photo-conversion device (e.g., a photo-diode).

Figure 2:
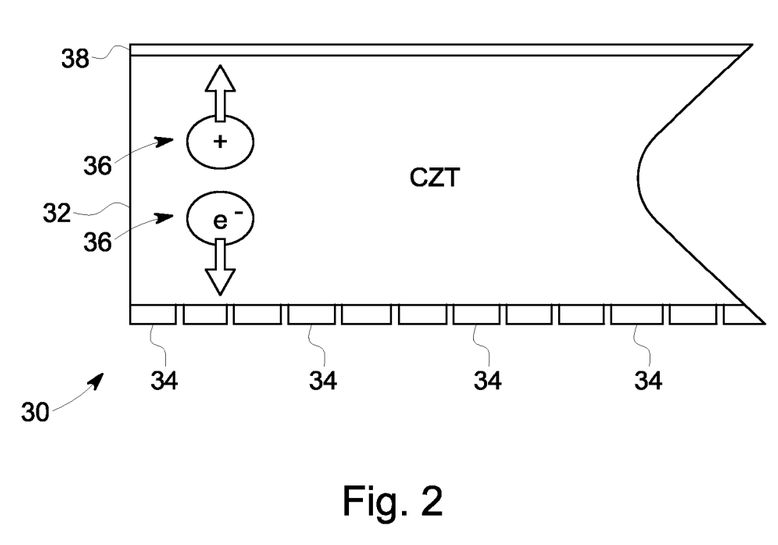
FIG. 2 is a simplified cross-sectional view of a portion of a pixelated detector in accordance with an embodiment.

One or more of the detectors 22 in various embodiments are pixelated detectors 30 as shown in FIG. 2, illustrating a simplified cross-sectional elevation view of a portion of the pixelated detector 30 formed in accordance with various embodiments. The pixelated detector 30 is formed from a crystal 32 that is formed from a radiation responsive semiconductor material, which in various embodiments is a direct conversion material, for example, a crystal of CZT. A pixelated structure having a plurality of pixels is defined, for example, by photolithography or by cutting or dicing of a contact metal on one surface or side of the crystal 32 to form a plurality of pixel electrodes, identified as anodes 34. In operation, a charge in the pixel electrodes, namely the anodes 34 is induced from a large number of electron-hole pairs 36 generated from a detected photon that is absorbed in the crystal 32.

The pixelated detector 30 also includes a cathode 38 on an opposite surface or side of the crystal 32 from the anodes 34 and which may be formed from a single cathode electrode. It should be noted that the anodes 34 generally define the pixels. It also should be noted that one or more collimators may be provided in front of a radiation detecting surface defined by the cathode 38.

Referring again to FIG. 1, the processor 24 may perform certain operations, such as processing operations at times determined by a scheduling channel as described in more detail herein. The scheduling channel may be implemented in hardware, software or a combination thereof and may form part of an application specific integrated circuit (ASIC) 240, which may be embodied as a controller for the detector 22.

Various embodiments may initiate or control different processing operations, for example, scheduling and/or generating control signals during data acquisition by the detector 22, without using a clock (e.g., no active clocking signal). The control may include, for example, control of digitization, control of internal state machines, such as the reset of critical analog circuitry, transition from different modes, such as peak detect to hold for peak detection of received signals, control of a time to voltage converter, control of the coincidence window for linking hits (e.g., photon detector hits) within the detector 22 and informing a master central processing unit (CPU) 29 (that may form part of the controller/processor 24) of an event by flagging a trigger, among others. Thus, in various embodiments, using a scheduling channel, timing for initiating different operations may be provided.

In one embodiment, the detector 22, and in particular the detector modules 26, sense energy emitted by the source 21 that has passed through an object 28. However, it should be noted that in some embodiments, the source of energy, may be a radiation source within the object 28, such as when a patient is injected with a radiopharmaceutical.

In response to detecting the energy from the source 21 or the object 28, the detector 22 produces analog electrical signals that represent the sensed energy. The analog data received from the detector 22, which may be provided via one or more anode channels 46 (e.g., signal channels connected to the anodes of the pixelated detector 22) is sampled and converted to digital signals using any suitable analog to digital conversion process. For example, in one embodiment, the detector modules 26 operate in a photon counting mode wherein x-ray photon energy emitted by the source 21 and passing through the object 28 is converted into current pulse signals, which are detected by the detector modules 26. It should be noted that in some embodiments the current pulse signals are integrated over a predetermined time period, then measured and digitized. In some embodiments the current pulse signals are used to generate images. However, in other embodiments, the detector modules 26 are used to detect a spectral response and no image is generated or formatted.

Thus, the processor 24 (and/or the CPU 29) performs subsequent processing, for example image reconstruction or spectral response determination using the digital signals. For example, the processor 24 may combine data from a calibration operation mode and an object-image-acquisition mode to produce count data for image reconstruction of the object 28. The reconstructed image(s) may be stored in a memory 42 and/or displayed on a display 44 by the processor 24 and/or another device. In other embodiments, such as a spectral response mode, a spectral response, such as for a security application or identification of a radionuclide may be determined.

Figure 3:
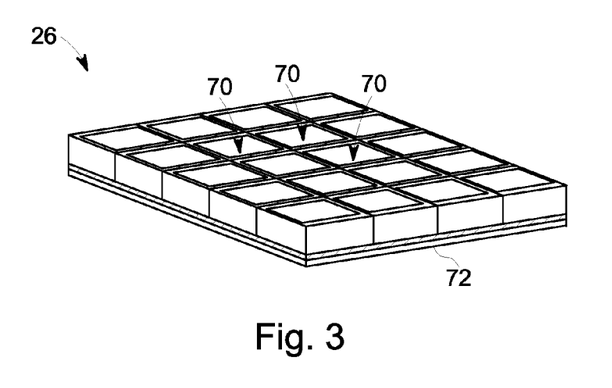
FIG. 3 is a perspective view of a portion of a detector module in accordance with an embodiment.

In various embodiments, as shown in FIG. 3, a plurality of sensor tiles 70 formed from a direct conversion material may be combined to form the detector modules 26 (illustrating one detector module 26). For example, the detector modules 26 may be configured as a rectangular gamma camera module that includes a plurality, for example, twenty sensor tiles 70 arranged to form a rectangular array of five rows of four sensor tiles 70. The sensor tiles 70 are shown mounted on a substrate 72 that is coupled to processing and/or communication circuitry using suitable techniques and may include the anode channels 46. It should be noted that detector modules 26 having larger or smaller arrays of sensor tiles 70 may be provided. Thus, in operation, the energy of a photon detected by the sensor tiles 70 is generally determined from an estimate of the total number of electron-hole pairs produced in a crystal forming the sensor tiles 70 when the photon interacts with the material of the crystal. This count is generally determined from the number of electrons produced in the ionizing event, which is estimated from the charge collected on the anode of the sensor tiles 70.

Various embodiments provide timing control for controlling the operation of various components within the radiation detector system 20, such as the detector 22 (and/or the source 21). For example, the timing of the operations and transitions of the internal state machines of the ASIC 240 may be controlled in accordance with various embodiments without using a clock (e.g., a system clock 33). The detector 24 may be connected to the ASIC 240 having a scheduler channel that generates timing controls as described in more detail herein. Additionally, data communication to and from the processing machine of the processor 24 (e.g., the CPU 29) is controlled to reduce the likelihood of corrupting signals received by the detector 22. Moreover, true detection events are distinguished from false events.

In one embodiment, signals are detected by and acquired from the detector 22 without using a clock to control the detection operations. Accordingly, in this embodiment, during active operation of the detector 22, such as during detection and acquisition times (e.g., the detector 22 is actively detecting photon count events), no clock is used. Thus, in this embodiment, a constant clock for timing of the various operations of the radiation detector system 20 is not used.

Figure 4:
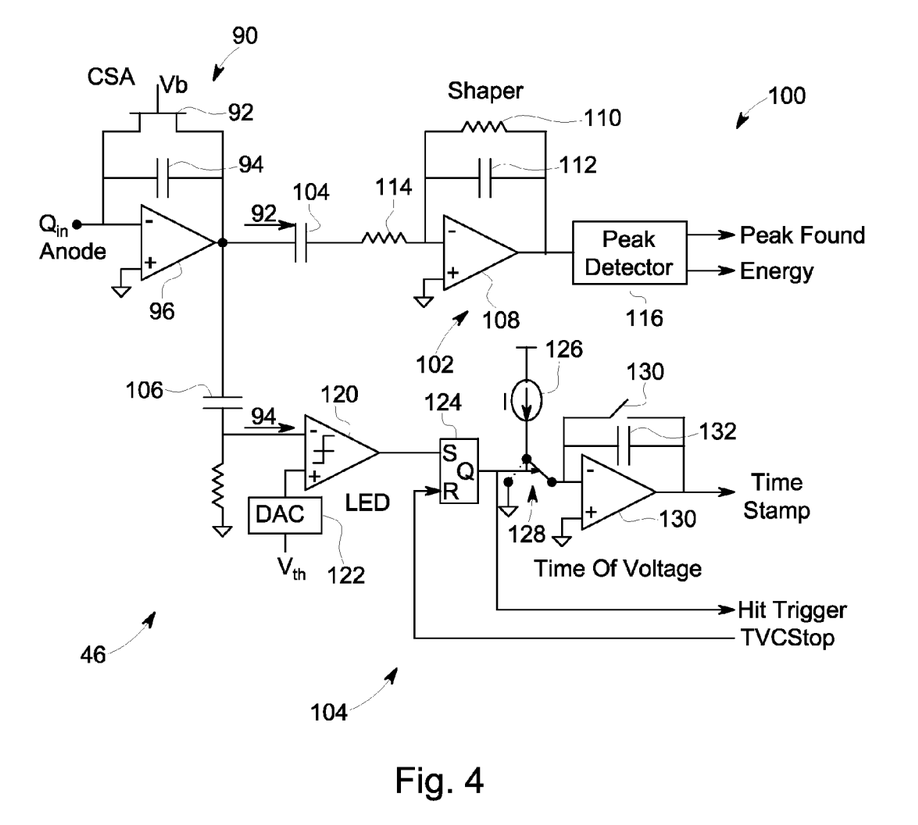
FIG. 4 is a schematic diagram of an anode channel in accordance with an embodiment.

Specifically, an architecture defining the anode channel 46 is shown in FIG. 4. The anode channel 46 generally includes a charge sensitive amplifier (CSA) 90 and a shaper 100. In one embodiment, the signal from the pixels of the pixelated detector 22 are integrated by the CSA 90, which includes two outputs 92 and 94 that are shaped using a low bandwidth bandpass filter 102 and a high bandwidth bandpass filter 104 as described in more detail herein.

The CSA 90 generally includes a parallel combination of a transistor 92 and a capacitor 94 connected between a negative input of an operational amplifier 96 and the output of the operational amplifier 96. The positive input of the operational amplifier 96 is grounded. The received signal from the anode ($Q_{in}$ Anode) of the detector 22 (shown in FIG. 1) is provided to the negative input of the operational amplifier 96.

The output from the operational amplifier 96, which includes the outputs 92 and 94 are sent to the low bandwidth bandpass filter 102 and the high bandwidth bandpass filter 104 through capacitors 105 and 106, respectively. The low bandwidth bandpass filter 102 includes an operational amplifier 108 having a negative input connected to receive the output signal 92 through the capacitor 105 and a resistor 114. A parallel combination of a resistor 110 and capacitor 112 is also connected between the negative input of the operational amplifier 108 and the output of the operational amplifier 108. The positive input of the operational amplifier 108 is connected to ground. It should be noted that the operational amplifiers illustrated in the embodiment of FIG. 4 are differential amplifiers (or comparators).

The output of the operational amplifier 108 is provided to a peak detector 116 that outputs control signals for use by the scheduling channel. It should be noted that in some embodiments, some or all of the architecture shown in FIG. 4 may form part of the scheduling channel.

In operation, the low bandwidth bandpass filter 102 outputs a PeakFound signal and an Energy signal identifying the height or peak of a pulse from a detected photon and an energy level, respectively. Thus, the low bandwidth bandpass filter 102 in this embodiment defines an energy channel portion of the anode channel 46. The low bandwidth bandpass filter 102 shapes the output signal 92 to determine energy information for a detected event and also may be referred to as a "slow" shaper. It should be noted that the time when the signal reaches a maximum is generally referred to as the peak time.

The high bandwidth bandpass filter 104 includes an operational amplifier 120 having a negative input connected to receive the output signal 94 through the capacitor 106. The positive input of the operational amplifier 120 is connected to a digital to analog converter (DAC) 122 that receives a voltage threshold ($V_{th}$) control signal as described in more detail herein. The output of the operation amplifier 120 is connected to a flip-flop 124, which in this embodiment is an RS flip-flop. In particular, the output of the operational amplifier 120 is connected to the S input of the flip-flop 124 and the R input of the flip-flop 124 receives a TVCStop control signal. The TVCStop signal is generated as described herein. In operation, a TVC signal within the channel starts integration of a current source 126 when a hit is recorded or detected by the detector 22 and the TVCStop signal stops the integration.

The output of the flip-flop 124 is connected to a switch 128 (illustrated as a double pole single throw switch), with the other pole connected to the current source 126. The switch 128 is operable to switch an input of an operational amplifier 130 (the negative input of the operational amplifier 130) between the current source 126 and the output of the flip-flop 124. The output of the flip-flop 124 is also used to generate a Hit Trigger signal as described in more detail herein.

The parallel combination of a switch 130 and a capacitor 132 is connected between the negative input of the operational amplifier 130 and the output of the operational amplifier 130. The output of the operational amplifier 130 also generates a Time Stamp signal as described herein. In operation the voltage on the capacitor 132 is digitized to record the incidence of a hit relative to the TVCStop.

Thus, the high bandwidth bandpass filter 104 in this embodiment defines a timing channel portion of the anode channel 46. The high bandwidth bandpass filter 104 shapes the output signal 94 to determine timing information for a detected event, and may be referred to as a "fast" shaper. In various embodiments, the high bandwidth bandpass filter 104 shapes the output signal 94 to record hits and initiate timing signals. The high bandwidth bandpass filter 104 operates as a timing circuit with a discriminator that rejects signals that are below a programmable threshold.

It should be noted that the peak of the slow shaper, namely the low bandwidth bandpass filter 102, is larger than the peak of the fast shaper, namely the high bandwidth bandpass filter 104. Additionally, it should be noted that the peak of the slow shaper occurs later in time than the peak of the fast shaper. These differences result due to the different bandpass filter characteristics.

Thus, various embodiments use shaper circuits, illustrated in the shaper 100 as timers (without clocks) for controlling operation within the radiation detector system 20. Thus, during detection times of the detector 22, no clock is used when generating control signals. Accordingly, analog circuits can be rest without a clock. In one embodiment, the following may be programmable in the anode channel 46:

DAC Threshold (5 bits);
Power to each detector block or module 26 (0.5×, 1×, 1.5×, 2×);
CSA 90 Capacitor (40 fF, 80 fF, 160 fF);
CSA 90 Reset Element;
Fast and Slow Shaping times;
Shaper Gain;
Time to Volt Current and Capacitor;
Channel specific disable; and
Block or module 26 specific test access.

In various embodiments, crosstalk signals are also ignored during data acquisition by the detector 22. In particular, the amount of crosstalk in the detector 22 is proportional to the energy of the true event. Accordingly, in various embodiments only large signals create enough crosstalk in neighboring pixels to trip the discriminators in the anode channel 46. Thus, the peaks of the crosstalk signals are not recorded.

In particular, in various embodiments, tracking of detector hits is enabled only around the peaking time of the signal. The detection of the peak is delayed using the signal provided through the DAC 122, which in one embodiment is a synthesized or generated Hit signal. This delayed start of peak detection avoids the detection of false peaks. It should be noted that values of the resistor 114 and capacitor 105, and the resistor 110 and capacitor 112 determines the peak of the signal.

Figure 5:
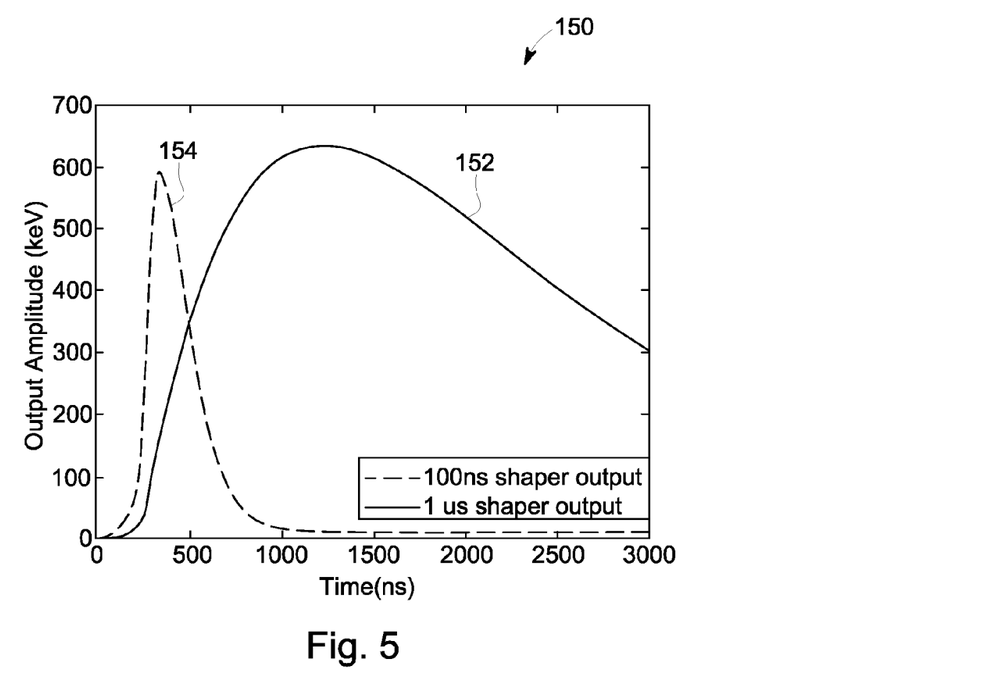
FIG. 5 is a graph illustrating slow and fast shaper outputs for a real signal.
Figure 6:
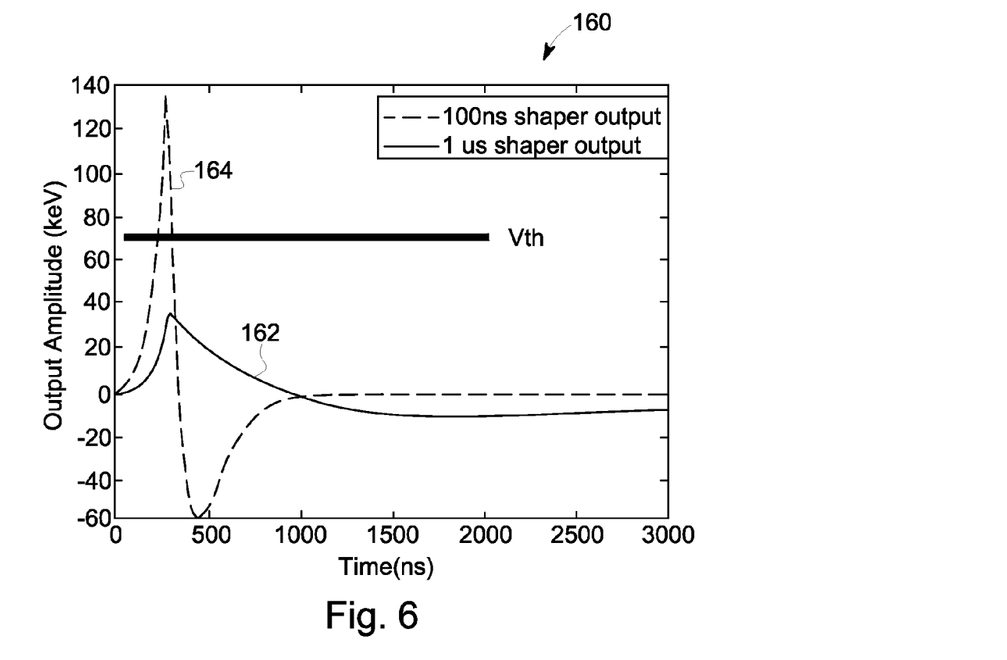
FIG. 6 is a graph illustrating slow and fast shaper outputs for a transient detected signal from weighting potential crosstalk.

For example, the graph 150 of FIG. 5 illustrates slow and fast shaper outputs for a real signal from a detected event. In particular, the curve 152 represents a real signal output from the slow shaper, namely the low bandwidth bandpass filter 102 and the curve 154 represents a real signal output from the fast shaper, namely the high bandwidth bandpass filter 104. The graph 160 of FIG. 6 illustrates slow and fast shaper outputs a transient detected signal (e.g., a detected event from an adjacent or neighboring pixel) from weighting potential crosstalk. In particular, the curve 162 represents a false signal output from the slow shaper and the curve 164 represents a false signal output from the fast shaper.

As can be seen, the amplitude of the curve is greater than the amplitude of the curve 162. Moreover, in various embodiments, although the transient signal, for example, in a neighboring pixel, may cause a trigger, the signal is not large enough to generate a peak found signal after a certain time period when using a determined threshold as shown in FIG. 6.

Thus, in various embodiments, the detection of the peak signal is delayed after the start of the hit signal (e.g., 500 nanoseconds) to reduce the likelihood or avoid the detection of a false peak. For example, referring again to FIG. 4, the threshold signal ($V_{th}$) to the DAC 122 in this embodiment is about 70 keV as illustrated in the graph 160 of FIG. 6 and the peak detect signal is also delayed based on the signal characteristic such that a false signal is below the threshold value after the delay time.

In some embodiments, a synthetic signal is generated that matches a signal output curve, such as the curve 152 or 154. It should be noted that instead of the synthetic signal, an OR gate of all of the anode channels 46 of the detector 22 may be used such that when one channel gets a hit, that hit becomes the synthetic signal.

Figure 7:
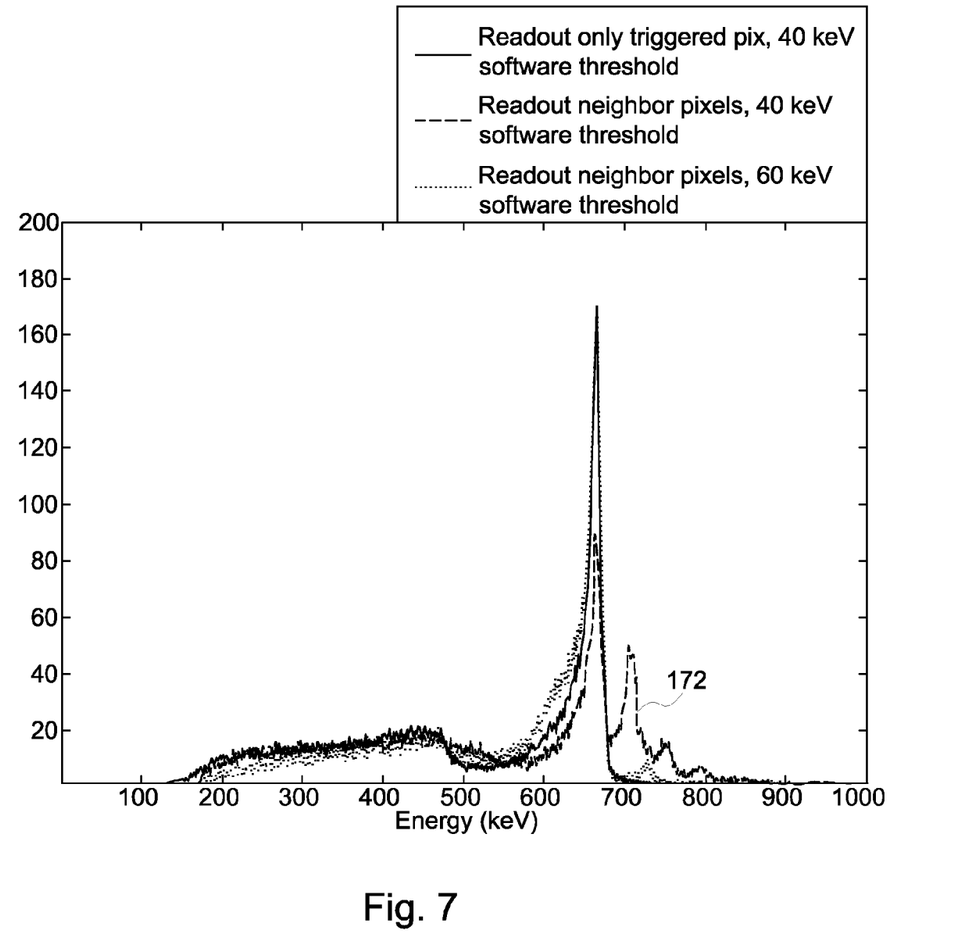
FIG. 7 is a graph illustrating signal corruption resulting from transient detected signals.

Using various embodiments, as shown in the graph 170 of FIG. 7, corruption of a signal, illustrated at 172, which is caused by a signal from a neighboring pixel, is reduced or eliminated.

In one embodiment, a consolidated Hit signal (indicating a detected hit) is input into the shaper 100. For example, the entire anode channel 46 may be duplicated with an input being a consolidated Hit signal instead of radiation.

Figure 8:
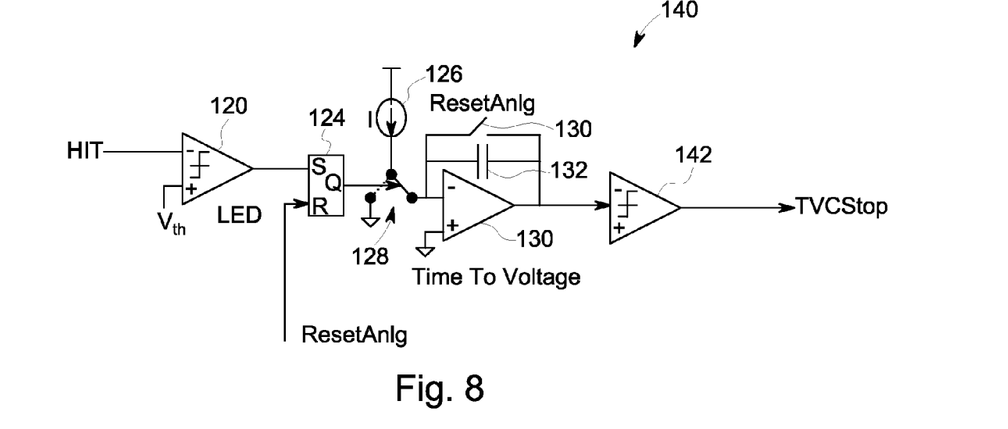
FIG. 8 is a schematic diagram of a timer circuit in accordance with an embodiment.

Accordingly, with respect to the generation of the TVCStop signal input to the flip-flop 124, a TVCStop timer circuit 140 as shown in FIG. 8 may be provided. As can be seen, the TVCStop timer circuit 140 is a duplicate of the high bandwidth bandpass filter 104. However, the R input of the flip-flop 124 receives an analog reset signal (ResetAnlg). Additionally, the output of the operational amplifier 130 is provided to another operational amplifier 142 (configured as a comparator), the output of which is the TVCStop signal. It should be noted that the TVCStop signal is sent to all channels.

Figure 9:
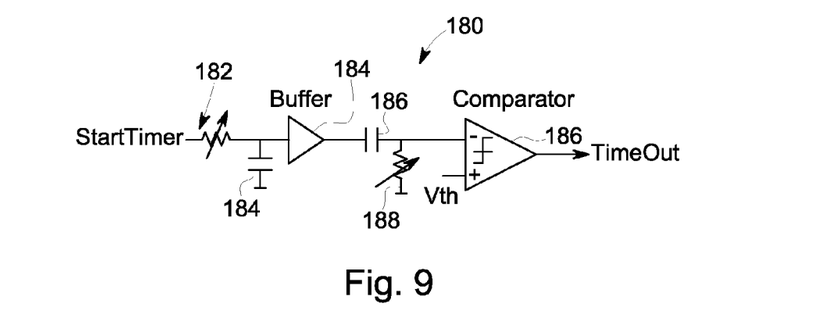
FIG. 9 is a schematic diagram of a scheduler timer in accordance with an embodiment.

In various embodiments, a scheduler circuit 180 (or shaper timers) as shown in FIG. 9 may be provided to generate appropriate signals. For example, multiple scheduler circuits 180 may mimic different circuit requirements with different time constants for triggering different operations. The scheduler circuit 180 generally includes a variable resistor 182 connected to an operational amplifier 184. A capacitor 184 is also connected between the input of the operational amplifier 184 and ground. The output of the operational amplifier 184 is connected to one input of an operational amplifier 186, configured as a comparator, through a capacitor 186. A variable resistor 188 is also connected between the input and ground. The other input of the operational amplifier 186 receives the threshold voltage signal ($V_{th}$). The output of the operational amplifier 186 is a TimeOut signal. Thus, by varying the voltage threshold signal, as well as the resistors 182 and 188, different time constants may be provided and used to generate different control signals, for example, PeakDetectReset (PDReset), PD Track, PD Hold, Trigger, ResetAnalog and HitEn as described in more detail below. The Peak Detect generally corresponds to detecting the peak of a particular signal.

Figure 10:
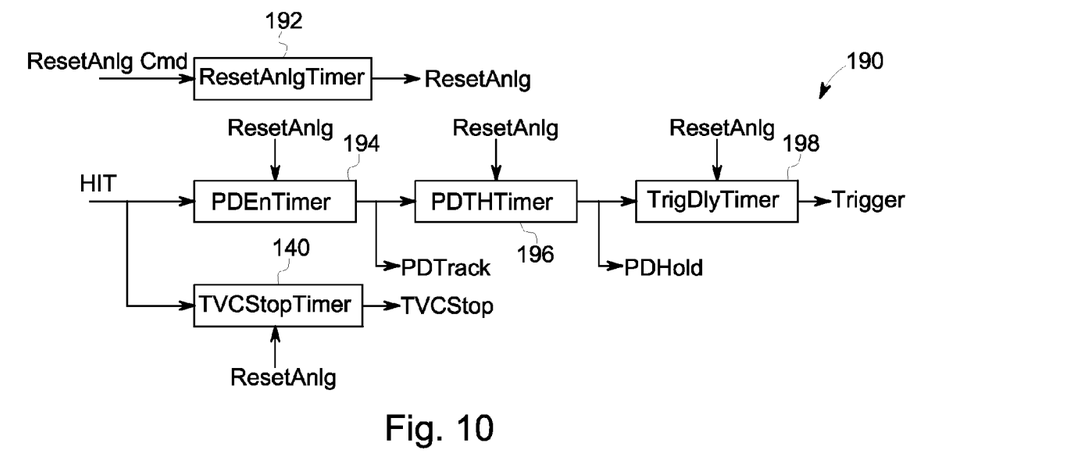
FIG. 10 is a block diagram of a scheduler arrangement in accordance with an embodiment.

A scheduler arrangement 190 as shown in FIG. 10 also may be provided (which may be embodied as the scheduler channel). In particular, the ResetAnlg signal is generated by a ResetAnlg Timer 192. Moreover, based on the detection of a Hit signal indicating a detected event by the detector 22 and the ResetAnlg signal, the PDTrack signal is generated by a PDEn Timer 194, which in various embodiments in provided by the scheduler timer 180 shown in FIG. 9. A TVCStop Timer 196 also generates the TVCStop signal based on the Hit signal and the ResetAnlg signal. The TVCStop Timer 196 may be provided as shown in FIG. 8.

The output of the PDEn Timer 194 is provided to a PDTH Timer 196, along with the ResetAnlg signal. The PDTH Timer 196 also may be provided by the scheduler timer 180 as shown in FIG. 9. The output of the PDTH Timer 196 generates a PDHold signal and is also provided to a TrigDlyTimer 198, along with the ResetAnlg signal, and which outputs the Trigger signal. The TrigDlyTimer 198 also may be provided by the scheduler timer 180 as shown in FIG. 9.

Figure 11:
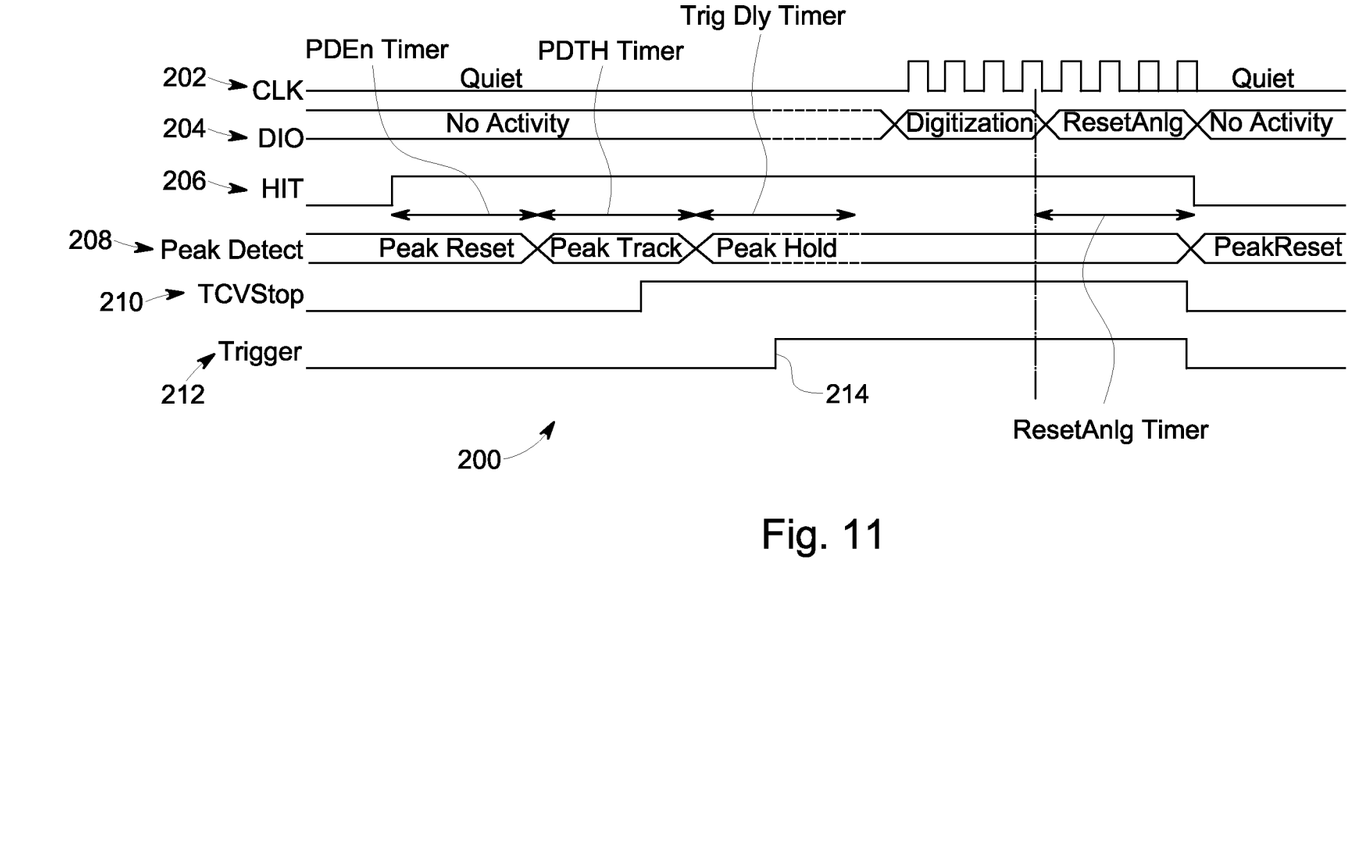
FIG. 11 is a timing diagram in accordance with an embodiment.

With respect to these various signals, in accordance with one embodiment, a timing diagram 200 is illustrated in FIG. 11, wherein the following signals are illustrated:

1. Clock (CLK) signal 202 corresponding to a system or CPU clock;
2. Digitization Input/Output (DIO) signal 204, corresponding to digitization of a detected event;
3. Detector hit (HIT) signal 206 corresponding to a detected hit (e.g., photon hit event) at the detector 22;
4. Peak detection signal (PeakDetect) 208 corresponding to a generated signal for resetting peak detection (PDReset), tracking peak detection (PDTrack) and holding peak detection (PD Hold);
5. TVCStop signal 210 to stop integration of events by the detector 22; and
6. Trigger signal 212 to initiate processing by the processor 24, such as digital processing.

As shown by the signal transition 214 of the Trigger signal 214 (illustrated by the transition from a low to high), at this point, the signal has already been acquired by the detector 22, such that no corruption is possible. Accordingly, as can be seen, processing, for example, digitization of the signals and other processing of the signals (e.g., using a Field-Programmable Gate Array (FPGA) or other processor) is initiated by the DIO signal 204, which also includes clocking as initiated by the CLK signal 202. Additionally, it should be appreciated that the peak detection is delayed by the timers (illustrated by the PDEnTimer, PDTHTimer and TrigDlyTimer arrows) to prevent the detection of false hits as described herein. It should also be noted that potential crosstalk may be weighted, such as based on the distance between pixels.

Figure 12:
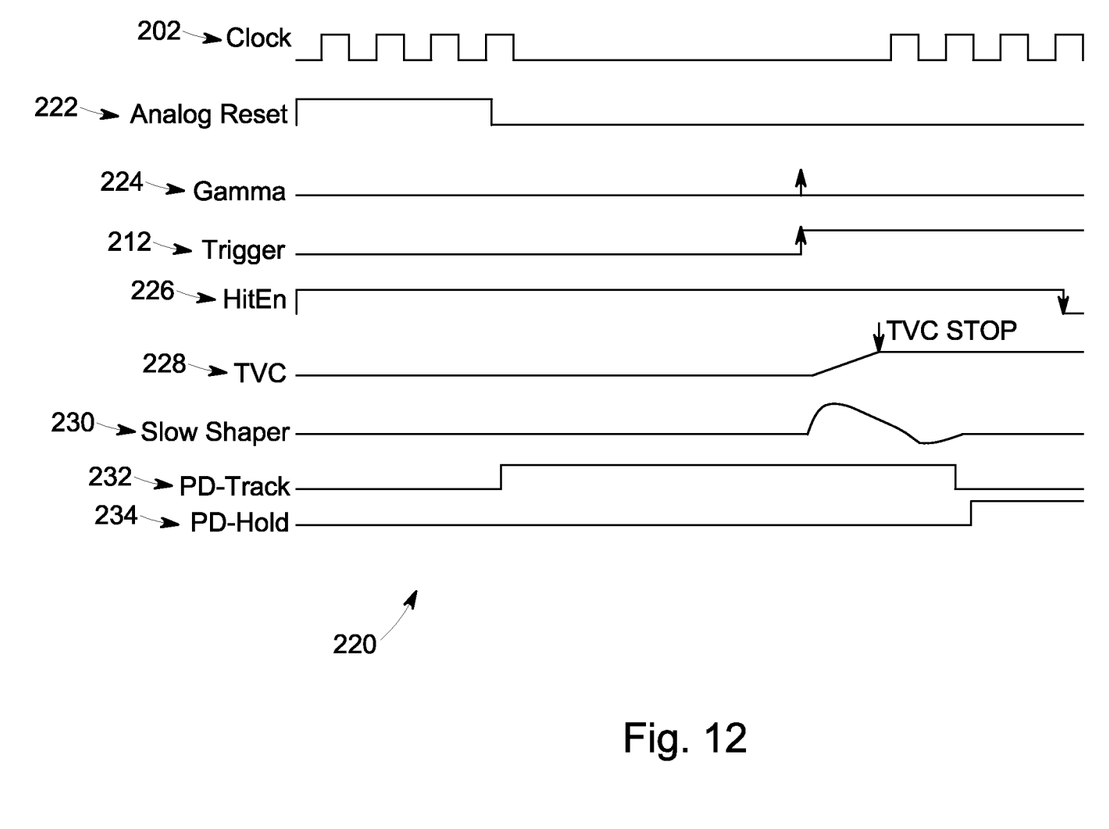
FIG. 12 is another timing diagram in accordance with an embodiment.

In various embodiments, timing signals may be provided as shown in the timing diagram 220 of FIG. 12 to control data acquisition of the detector 22 without use of a clock, wherein the following signals are illustrated:

1. Clock (CLK) signal 202 corresponding to a system or CPU clock;
2. Analog reset (AnalogReset) signal 222 resetting analog operations;
3. Gamma signal 224 corresponding to a detected gamma ray by the detector 22;
4. TVCStop signal 210 to stop integration of events by the detector 22;
5. Hit enable (HitEn) signal 226 to place the detector 22 in detection mode;
6. TVC Signal 228 to start integration of events by the detector 22;
7. Slow Shaper signal 230, which is the output of the low bandwidth bandpass filter 102;
8. Peak detection track (PD Track) signal 232 to initiate tracking of signal peak; and
9. Peak diction hold (PD Hold) signal 234 to maintain the tracking of signal peak.

Thus, the anode channel 46 issues the Trigger signal 212 to the CPU after generating the TVCStop signal 210, PD Hold signal 234 and HitEn signal 226. It should be noted that the scheduler channel also internally generates the HitEN signal 226 to eliminate a digital input from the CPU. Moreover, analog circuits can be reset with the AnalogReset signal 22 without a clock. Additionally, the TVC Signal 228, Slow Shaper signal 230, PD Track signal 232 and PD Hold signal 234 are also generated without a clock and as described in more detail herein to control operation of the detector 22 during data acquisition.

Figure 13:
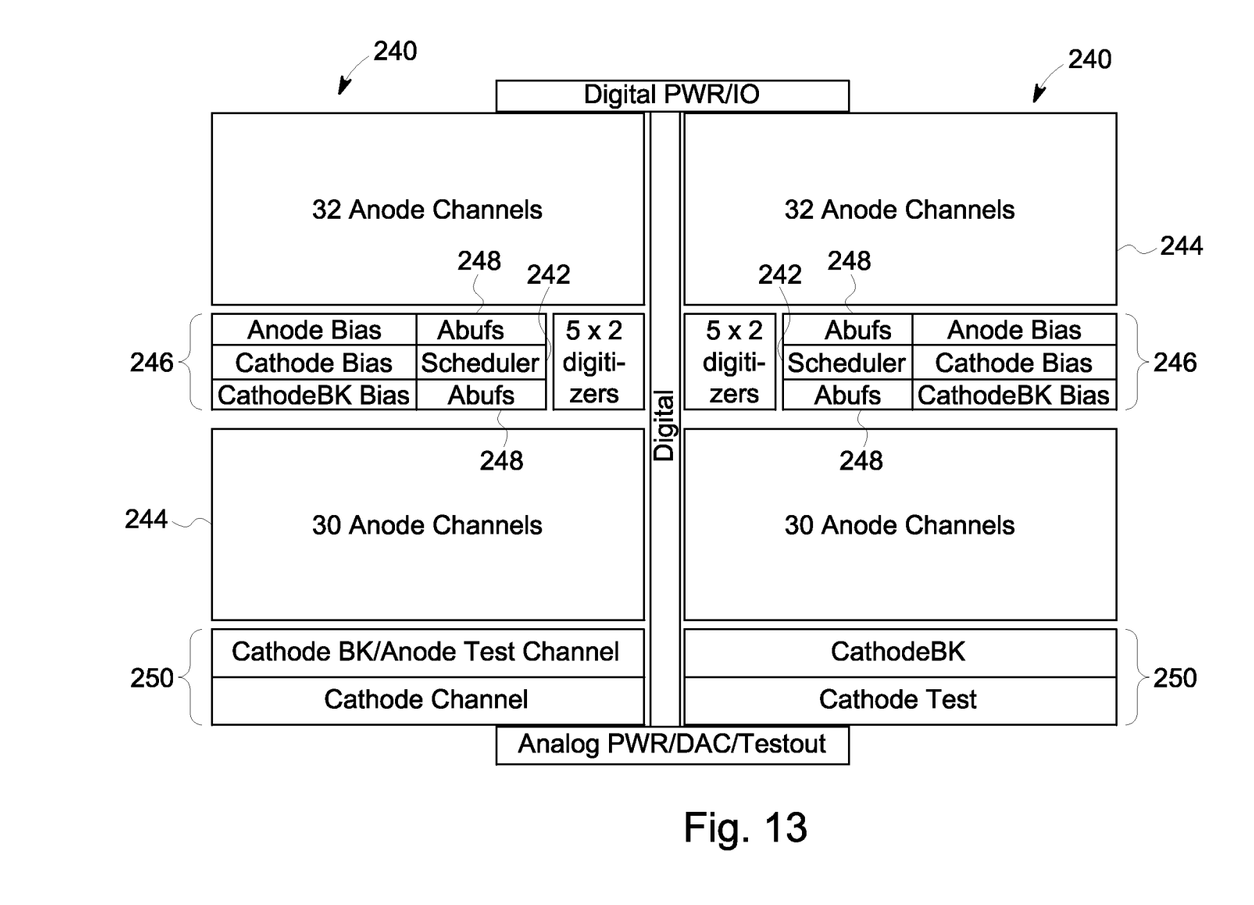
FIG. 13 is a block diagram of an application specific integrated circuit (ASIC) implementation in accordance with an embodiment.

In various embodiments, an ASIC 240 as shown in FIG. 13 may be provided with a single scheduler 242 per chip (e.g., defining a scheduler channel). The ASICs 240 generally include a plurality of anode channels 244 which include biasing 246 and buffering 248, which may be provided using any suitable techniques. Additionally, testing components 250 also may be provided. Thus, an integrated chip design may be provided that includes one or more embodiments.

The electronics of the ASIC 240 in various embodiment provide the scheduler channel as described herein. In one embodiment, all of the anodes 34 and cathode 38 connected to the crystal 32 (shown in FIG. 2) reside within the ASIC 240. In operation, as described in more detail herein, when any of the anode/cathode electronics receives a signal, the Hit signal is generated when the signal exceeds a threshold. If the Hit signal is generated, it is provided to the scheduler 242 and various timing is generated, such as various timing signals (e.g., PeakDetect, PeakReset, etc.). Thereafter, once the sensitive signal(s) is acquired (e.g., the detected events signals that may be corrupted by digital activity), the ASIC 204 informs the control electronics (e.g., the processor 24 of FIG. 1) to perform additional functions, such as digitization, etc. as described herein.

It should be noted that the scheduler channel in various embodiments, such as to have reduced likelihood to process variations, etc., is designed similar to the anode and cathode channels. Accordingly, bandwidth changes and/or temperature changes, for example, in the anode are automatically tracked by the scheduler and control signals are generated at appropriate times as described herein.

Figure 14:
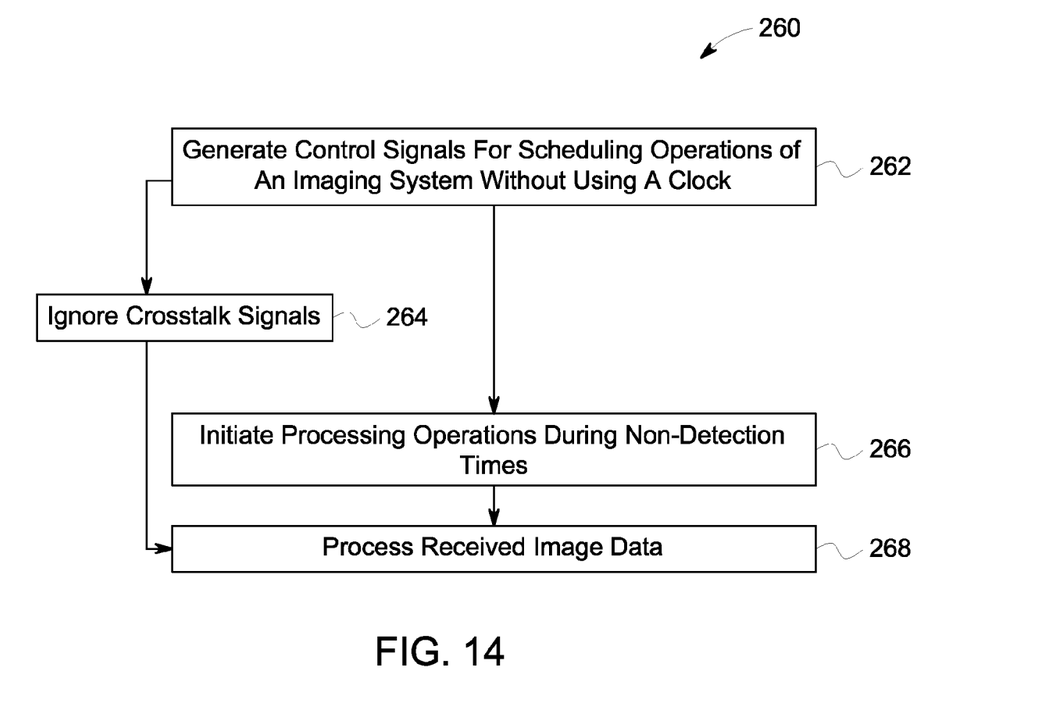
FIG. 14 is a flowchart of a method for scheduling operations in a radiation detector system in accordance with an embodiment.

Various embodiments also provide a method 260 as shown in FIG. 14 for generating control signals and scheduling operations in a radiation detector system, which in some embodiments is a radiation detector system having pixelated detectors formed from a direct conversion material. For example, the method 260 may provide a scheduler channel that initiates digital communication with a processor at non-critical times, such as when the detector is not active and acquiring data, as well as generates control signals without a clock during signal acquisition times.

The method 260 includes generating control signals at 262 for scheduling operations of the radiation detector system without using a clock. For example, the signal levels from the detector may be corrupted by digital activity. Thus, in various embodiments, all digital activity is halted during detector signal acquisition. However, clocking for scheduling different operations during this time period is needed. Accordingly, various embodiments provide control signals that are timed without a clock and that may be used, for example, for digitization, control of internal state machines like the reset of critical analog circuitry (e.g., ResetCSA, ResetShaper, ResetHit), transitioning from a peak detect to hold state of the detector (e.g., PDTrack to PDHold), controlling of time to voltage converter (e.g., TVCSTOP), controlling the coincidence window for linking hits within the detector (e.g., HITEN) and informing the master CPU of an event by flagging a Trigger signal. As described in more detail herein, the control signals may provide, for example, ASIC timing with anode channels having a charge sensitive amplifier, slow and fast signal shapers and shaper timers that are all programmable. Thus, one or more scheduler channels may be provided without a clock that can also reset analog circuits.

During the time period of data acquisition, in particular during signal acquisition by the detector(s), crosstalk signals are ignored at 264. For example, as described herein, a peak detect time and tracking time may be delayed using the control signals without a clock, which may be used in combination with a threshold control signal.

Thereafter, such as after signal acquisition, at 266, processing operations, for example, digitization operations to digitize received analog signals may be initiated. During this period when no signals are being acquired by the detector(s), which may be referred to as non-detection times, clocking with a clock also may be provided.

The received signals corresponding in various embodiments to image or spectral response data is then processed at 268, for example, using suitable image reconstruction techniques or spectral analysis techniques.

Thus, various embodiments provide scheduling and generation of control signals during detector active times without using a clock. Additionally, transient crosstalk signals are ignored using control signals generated without a clock.

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as an optical disk drive, solid state disk drive (e.g., flash RAM), and the like. The storage device may also be other similar means for loading computer programs or other instructions into the computer or processor.

As used herein, the term "computer" or "module" may include any processor-based or microprocessor-based system including systems using microcontrollers, Reduced Instruction Set Computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program, which may form part of a tangible non-transitory computer readable medium or media. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A scheduling architecture for radiation detect system, the scheduling architecture comprising:
    at least one anode channel connected to a detector of a radiation detector system, the anode channel including a charge sensitive amplifier and a signal shaper, the anode channel configured to generate at least one control signal to control data acquisition by the detector; and
    at least one shaper timer configured having a time constant to define timing for the generation of the control signal without using a clock.

2. The scheduling architecture of claim 1, wherein the shaper comprises a slow shaper and a fast shaper.

3. The scheduling architecture of claim 2, wherein the slow sharper comprises a low bandwidth bandpass filter and the fast shaper comprises a high bandwidth bandpass filter.

4. The scheduling architect of claim 1, wherein the anode channel is Programmable.

5. The scheduling architecture of claim 1, further comprising a timer without a clock configured to generate a reset signal for resetting at least one analog circuit.

6. The scheduling architecture of claim 1, further comprising a plurality of shaper timers configured to generate different control signals without using a clock and having different time constants.

7. The scheduling architecture of claim wherein the anode channel is configured to delay a peak detection period for the detector.

8. The scheduling architecture of claim 1, wherein the detector is a pixelated direct conversion detector.

9. The scheduling architecture of claim 1, wherein the radiation detector system comprises at least one of a Computed Tomography (CT) system, a Positron Emission Tomography (PET) system or a Single Photon Emission Computed Tomography (SPECT) system.

10. The scheduling architecture of claim 1, wherein the anode channel is configured to generate the control signal during a signal acquisition period of the detector.

11. The Scheduling architecture of claim 1, wherein the signal shaper comprises an energy channel and a timing channel.

12. The scheduling architecture of claim 1, wherein the anode channel is configured to use a synthesized signal to generate the control signal.

13. The scheduling architecture of claim 1, wherein the anode channel and shaper timer are formed on a single chip having a single scheduler.

14. A radiation detector system comprising:
at least one pixelated detector formed from a direct conversion material;
a controller configured to control operation of the detector, wherein the controller generates timing signals during a signal acquisition period of the pixelated detector without using a clock; and
a processor Configured to process signals acquired by the pixelated detector, the processing including digital activity performed during non-acquisition periods of the pixelated detector.

15. The radiation detector system of claim 14, wherein the controller is an application specific integrated circuit (ASIC) and comprises at least one anode channel connected to the detector, the anode channel including (i) a charge sensitive amplifier and a signal shaper, the anode channel configured to generate at least one control signal to control operation of the detector, and (ii) at least one shaper timer configured having a time constant to define timing for the generation of the control signal without using a clock.

16. The radiation detector system of claim 15, wherein the shaper comprises a slow shaper and a fast shaper, the slow shaper being a low bandwidth bandpass filter and the fast shaper being a high bandwidth bandpass filter.

17. The radiation detector system of claim 14, further comprising a timer without a clock configured to generate a reset signal for resetting at least one analog circuit.

18. The radiation detector system of claim 14, wherein the controller is configured to delay a peak detection period for the detector.

19. The radiation detector system of claim 14, wherein the pixelated detector is configured to detect at least one of x-rays or gamma rays.

20. A method for scheduling operations in a radiation detector system, the method comprising:
generating control signals for scheduling operations of a radiation detector system without using a clock during detection times of a detector of the radiation detector system;
initiating processing operations during non-detection times of the detector of the radiation detector system; and
processing received data during the non-detection times.

21. The method of claim 20, further comprising ignoring crosstalk signals from the detector by delaying a peak detection period for the detector, the delay determined by a timer not using a clock.

* * * * *